United States Patent
Finkielsztein et al.

(10) Patent No.: US 12,518,312 B2
(45) Date of Patent: Jan. 6, 2026

(54) USING OPTICAL CHARACTER RECOGNITION EXTRACTION AND LANGUAGE MODEL TO POPULATE AN ORDER WITH ITEMS FROM A RECIPE

(71) Applicant: Maplebear Inc., San Francisco, CA (US)

(72) Inventors: Noah Finkielsztein, Toronto (CA); Weiyue Li, Toronto (CA); Muhammad Aun, Austin, TX (US); Ilya Dyoshin, San Diego, CA (US)

(73) Assignee: Maplebear Inc., San Francisco, CA (US)

( * ) Notice: Subject to any disclaimer, the term of this patent is extended or adjusted under 35 U.S.C. 154(b) by 184 days.

(21) Appl. No.: 18/239,341

(22) Filed: Aug. 29, 2023

(65) Prior Publication Data

US 2025/0078139 A1    Mar. 6, 2025

(51) Int. Cl.
*G06Q 30/0601* (2023.01)
*G06V 30/14* (2022.01)
*G06V 30/18* (2022.01)

(52) U.S. Cl.
CPC ... *G06Q 30/06333* (2025.08); *G06Q 30/0625* (2013.01); *G06V 30/1448* (2022.01); *G06V 30/18* (2022.01)

(58) Field of Classification Search
CPC ... G06Q 30/0601–06444; G06Q 50/12; G06V 30/10; G06V 30/14; G06V 30/142–1437; G06V 30/148–158; G06V 30/18; G06V 30/19; G06V 30/24–2552; G06V 30/302; G06F 16/95–9538
See application file for complete search history.

(56) References Cited

U.S. PATENT DOCUMENTS

| | | | |
|---|---|---|---|
| 2008/0189187 A1* | 8/2008 | Hao | G06Q 30/0633 705/26.8 |
| 2014/0081955 A1* | 3/2014 | Osaki | G06Q 10/10 707/722 |
| 2014/0249966 A1* | 9/2014 | Zaragoza | G06Q 30/0635 705/26.81 |

(Continued)

OTHER PUBLICATIONS

Instacart's new 'Shoppable Recipes' feature lets creators link shopping lists to their TikTok videos. Aisha Malik. Mar. 16, 2022. https://techcrunch.com/2022/03/16/instacarts-new-shoppable-recipes-feature-lets-creators-link-shopping-lists-to-their-tiktok-videos/ (Year: 2022).*

*Primary Examiner* — William J Allen
(74) *Attorney, Agent, or Firm* — Fenwick & West LLP

(57) ABSTRACT

Embodiments relate to utilizing an optical character recognition extraction and a large language model (LLM) to automatically populate a shopping cart of a user of an online system with items from a physical recipe. The online system receives an image capturing the physical recipe and extracts a raw text from the received image. The online system generates a prompt for input into the LLM, the prompt including a task request for the LLM to generate a list of ingredients using the raw text. The online system inputs the prompt into the LLM to generate the list of ingredients. The online system maps the list of ingredients to a list of items available by one or more retailers associated with the online system. The online system causes a device of the user to display a user interface with the list of items.

18 Claims, 8 Drawing Sheets

(56) References Cited

U.S. PATENT DOCUMENTS

| | | | |
|---|---|---|---|
| 2016/0188712 A1* | 6/2016 | Radcliffe | G06F 40/284 |
| | | | 704/245 |
| 2017/0228364 A1* | 8/2017 | Byron | G06F 40/211 |
| 2018/0203597 A1* | 7/2018 | Lee | H04M 1/72403 |
| 2018/0268471 A1* | 9/2018 | Slusarczyk | G06T 1/0007 |
| 2019/0213914 A1* | 7/2019 | Vallance | G09B 19/0092 |
| 2020/0019597 A1* | 1/2020 | Leeser | G06F 16/5846 |
| 2020/0184535 A1* | 6/2020 | Barkan | G06F 16/252 |
| 2021/0192596 A1* | 6/2021 | Archak | G06F 16/24578 |
| 2021/0200753 A1* | 7/2021 | Perelman | G06F 16/248 |
| 2021/0241342 A1* | 8/2021 | Naidu | G06F 16/24522 |
| 2023/0043011 A1* | 2/2023 | Kim | F25D 29/00 |
| 2024/0070993 A1* | 2/2024 | Tiku | G06V 20/10 |

\* cited by examiner

USING OPTICAL CHARACTER RECOGNITION EXTRACTION AND LANGUAGE MODEL TO POPULATE AN ORDER WITH ITEMS FROM A RECIPE

BACKGROUND

Users of online systems, such as online concierge systems, face significant challenges when attempting to convert physical recipes (i.e., handwritten paper recipes) into their shopping carts. The lack of a straightforward and user-friendly method to accomplish this task hinders the overall online shopping experience. Converting a physical recipe into a shopping cart requires accurately translating the ingredients and quantities listed in the recipe into specific products available at grocery stores. However, the online concierge systems lack the necessary infrastructure to seamlessly convert generic ingredients into specific products. One of the primary difficulties for this lies in the variability of ingredient descriptions and the absence of standardized product information across different recipes and stores. Generic terms such as "tomatoes," "chicken breast," or "white rice" can encompass numerous variations, including different brands, sizes, packaging options, and quality grades. This leads to ambiguity and inconsistency when attempting to map these generic ingredients to the precise products offered by retailers.

Additionally, handwritten or physical recipes present an additional challenge. The process of manually entering the ingredients from physical recipes into an online platform can be time-consuming and prone to errors. Users may struggle with legibility issues, unclear handwriting, or unfamiliar ingredients, further complicating the conversion process. Many users rely on online concierge systems for convenience, quick shopping, and personalized recommendations. However, without the ability to convert physical recipes seamlessly, the users are forced to manually search for each ingredient, potentially leading to frustration and a disjointed shopping experience. It is therefore desirable to create technology that reduces the friction of going from a physical recipe to a shopping list, which is currently highly manual.

SUMMARY

Embodiments of the present disclosure are directed to utilizing an optical character recognition extraction and a language model to automatically populate a shopping cart of a user of an online concierge system with items from a physical recipe. The physical recipe may be a handwritten or manually typed set of ingredients that is available on paper or as an image of a paper recipe.

In accordance with one or more aspects of the disclosure, an online concierge system receives an image capturing a physical recipe and extracts a raw text from the received image. The online concierge system generates a prompt for input into a large language model (LLM), the prompt including a task request for the LLM to generate a list of ingredients using the raw text. The online concierge system inputs the prompt into the LLM to generate the list of ingredients. The online concierge system maps the list of ingredients to a list of items available by one or more retailers associated with an online concierge system. The online concierge system causes a device of a user of the online concierge system to display a user interface with the list of items for inclusion into a shopping cart of the user.

DETAILED DESCRIPTION

Figure 1A:
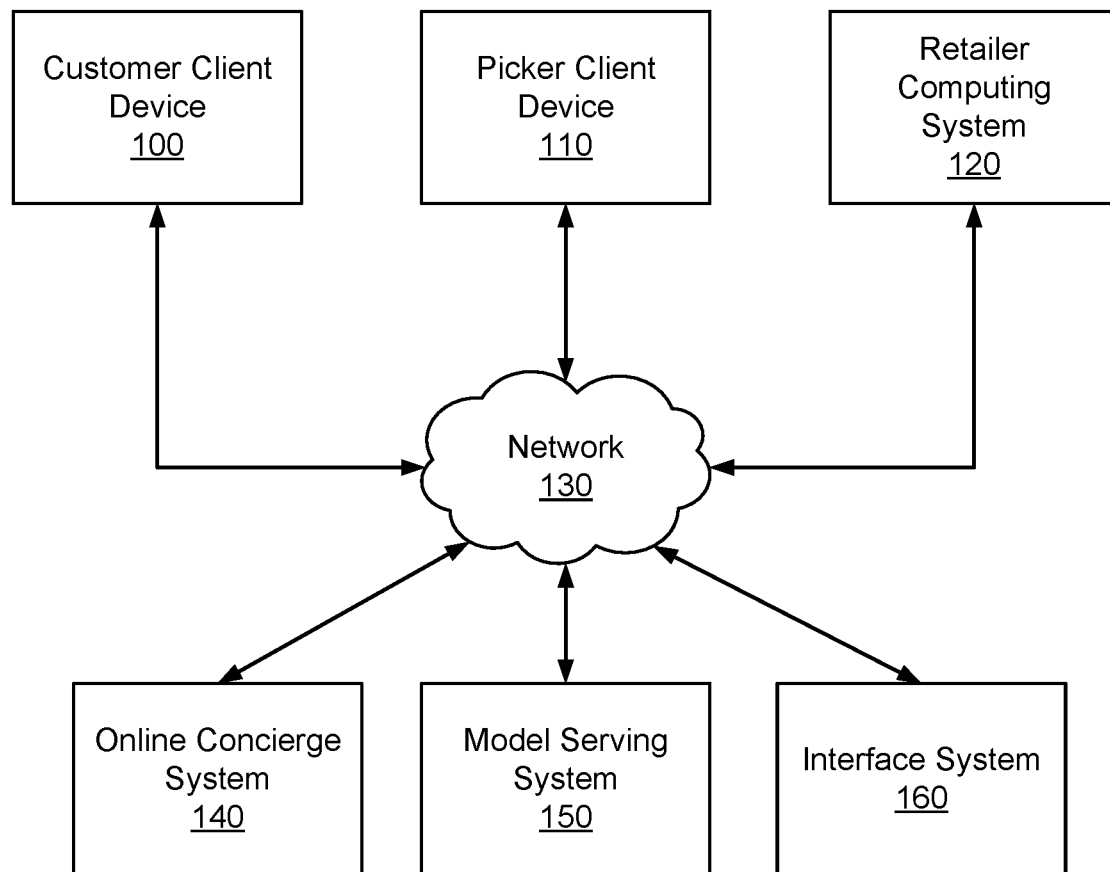
FIG. 1A illustrates an example system environment for an online concierge system, in accordance with one or more embodiments.

FIG. 1A illustrates an example system environment for an online concierge system 140, in accordance with one or more embodiments. The system environment illustrated in FIG. 1A includes a customer client device 100, a picker client device 110, a retailer computing system 120, a network 130, an online concierge system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1A, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

The model serving system 150 receives requests from the online concierge system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online concierge system 140 or one or more entities different from the online concierge system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In accordance with one or more embodiments, the online concierge system 140 and a mobile application associated with the online concierge system 140 (e.g., at the customer client device 100) are initially used to capture an image of a physical recipe (e.g., handwritten or manually typed paper recipe). The captured image of the physical recipe may be then passed through an optical character recognition (OCR) tool of the online concierge system 140 that runs an OCR algorithm to extract a raw text from the physical recipe. After that, the online concierge system 140 may perform a high-level cleanup of the extracted raw text to, e.g., parse white spaces and prepare the raw text for input into the LLM of the model serving system 150.

The online concierge system 140 prepares a prompt for input to the LLM of the model serving system 150. The prompt may be prepared based at least in part on the raw text extracted from the physical recipe. The prompt may include the extracted raw text, a request to identify a list of ingredients in the physical recipe contained therein, and information that the raw text is associated with a recipe (i.e., some set of ingredients). The prompt for input to the LLM may further include a request to output the list of ingredients in a desired format (e.g., JavaScript Object Notation (JSON) format). Thus, the LLM is prompted to provide a response that includes the list of ingredients (e.g., in the desired format) from the physical recipe.

The online concierge system 140 may receive a response to the prompt from the model serving system 150 based on execution of the machine-learned model using the prompt. The response may include the list of ingredients as contained in the physical recipe. The online concierge system 140 may import the response from the model serving system 150 and use the imported response as a search query for searching through a catalog of items at the online concierge system 140, e.g., at the data store 240. By performing the search through the catalog of items, the online concierge system 140 may match the list of ingredients to a set of specific items available at one or more retailers associated with the online concierge system 140.

Once a resulting list of items is found, the online concierge system 140 may provide the resulting list of items to a customer via a user interface on, e.g., a mobile application of the customer client device 100. The user interface displayed at the customer client device 100 may enable the customer to add the resulting list of items as a group to a customer's shopping cart. Alternatively, the resulting list of items may be automatically included into the shopping cart. The user interface displayed at the customer client device 100 may further include an option for the customer to cancel any item from the resulting list of items from the shopping cart, such as one or more items that the customer already possesses. More details about this approach to automatically populate a shopping cart of a customer of the online concierge system 140 with items from a physical recipe are provided in relation to FIGS. 2 through 5.

In one or more embodiments, the task for the model serving system 150 is based on knowledge of the online concierge system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online concierge system 140 is connected to an interface system 160. The interface system 160 receives external data from the online concierge system 140 and builds a structured index over the external data using, for example, another machine-learned language model or heuristics. The interface system 160 receives one or more queries from the online concierge system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online concierge system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

Figure 1B:
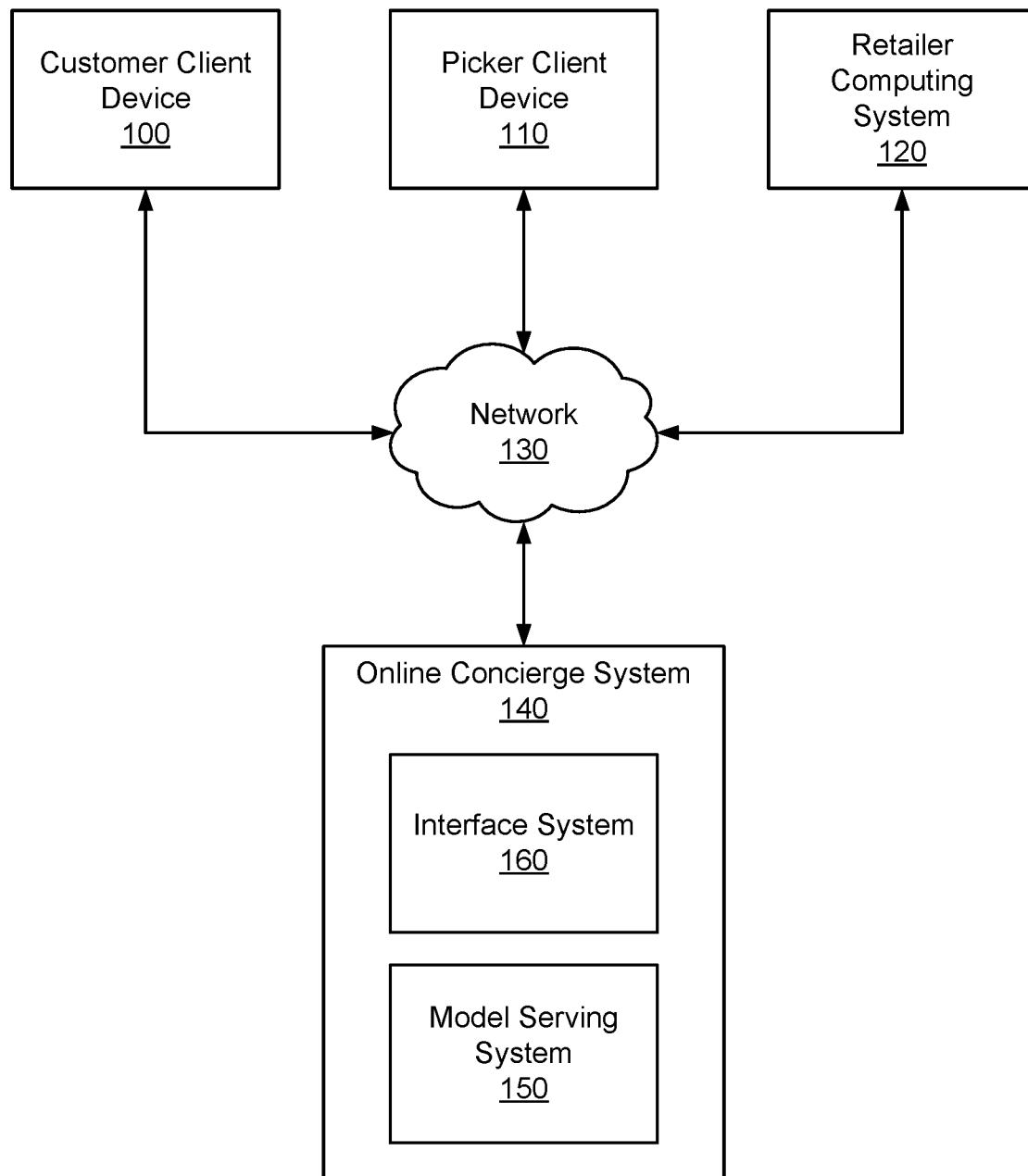
FIG. 1B illustrates an example system environment for an online concierge system, in accordance with one or more embodiments.

FIG. 1B illustrates an example system environment for an online concierge system 140, in accordance with one or more embodiments. The system environment illustrated in FIG. 1B includes a customer client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online concierge system 140.

Figure 2:
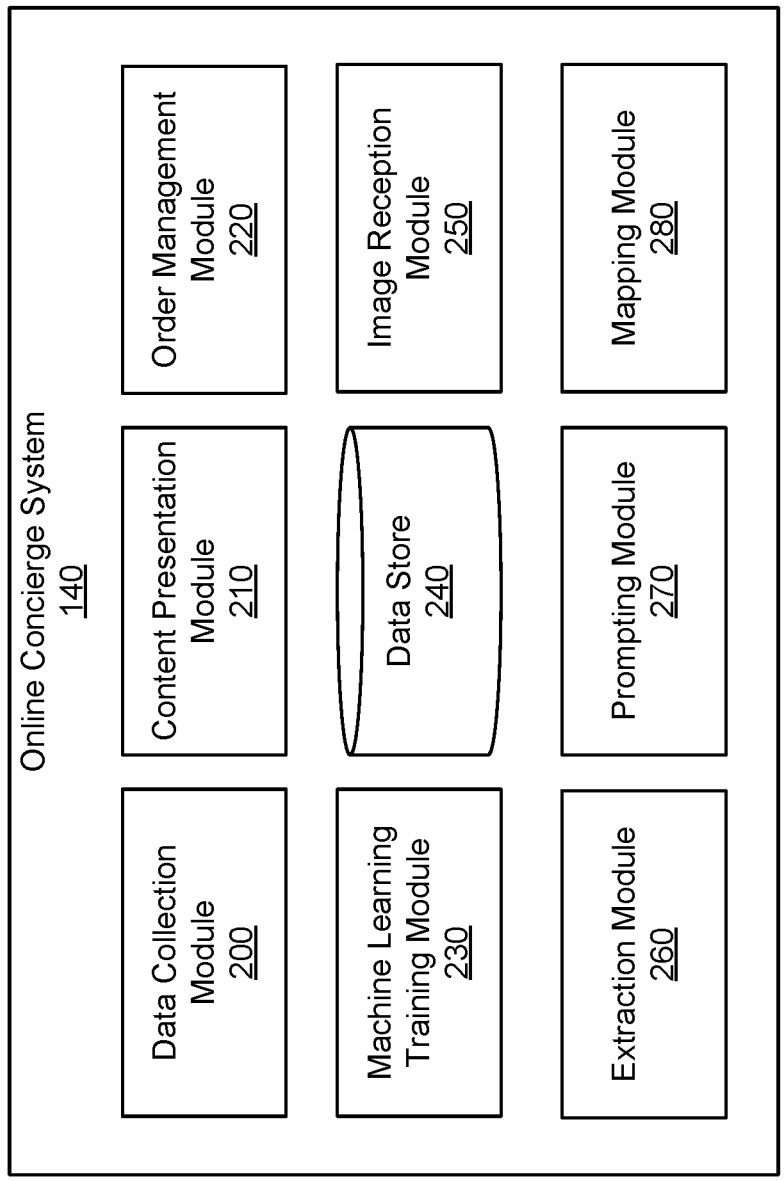
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, an image reception module 250, an extraction module 260, a prompting module 270, and a mapping module 280. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. For example, the machine learning training module 230 may train the item selection model, the availability model, or any of the machine-learned models deployed by the model serving system 150. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering.

The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online concierge system 140. In another embodiment, when the model serving system 150 is included in the online concierge system 140, the machine-learning training module 230 may further train parameters of the machine-learned model based on data specific to the online concierge system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

The image reception module 250 may receive an image of a physical recipe (e.g., an image of a handwritten recipe). In one or more embodiments, the image reception module 250 receives image data for the image of the physical recipe that is captured by a customer of the online concierge system 140 using, e.g., the mobile application at the customer client device 100. In one or more other embodiments, the image reception module 250 receives image data for an image of a physical recipe that the customer obtained directly in a digital form (e.g., from an email, a webpage, etc.). The image reception module 250 may pass the received image data to the extraction module 260.

The extraction module 260 may extract a raw text from the received image data. The extraction module 260 may utilize an OCR algorithm as a built-in feature to automatically extract the raw text from the image data, thus converting the captured image into a machine-readable format. The extraction module 260 may also extract information that the raw text relates to a recipe (i.e., set of ingredients and their quantities). The extraction module 260 may further extract a bounding box from the captured image that contains at least one image of at least one ingredient (e.g., one or more images of food), which can be part of a multimodal prompt input into a LLM (e.g., LLM of the model serving system 150). The extraction module 260 may pass the extracted raw text, the information that the raw text relates to the recipe, and, optionally, at least one image of at least one ingredient to the prompting module 270.

The prompting module 270 may generate a prompt for input into the LLM. In one or more embodiments, the prompting module 270 generates the prompt that includes the raw text received from the extraction module 260, the information that the raw text relates to the recipe (e.g., received from the extraction module 260 or automatically included by the prompting module 270), and a task request for the LLM to generate a list of ingredients. The task request may further include a request for the LLM to generate the list of ingredients in a specific format (e.g., JSON format). Alternatively, the prompting module 270 may generate a multimodal prompt for input into the LLM. In addition to a textual part of the prompt (e.g., the raw text and the task request), the multimodal prompt may further include at least one image of at least one ingredient that was extracted from the image of the physical recipe (e.g., by the extraction module 260).

Based on the prompt generated by the prompting module 270, the LLM generates a response that includes the list of ingredients as contained in the physical recipe. The list of ingredients may be generated in a specific format (e.g., JSON format) as requested in the task request provided by the prompting module 270. By analyzing the language context in the prompt, the LLM as a powerful natural language processing tool may parse and comprehend the raw text to generate a comprehensive ingredient list. The LLM may accurately identify the ingredients from the physical recipe as well as a quantity of each ingredient as specified in the physical recipe.

The mapping module 280 imports the response from the LLM that includes the list of ingredients that were included in the physical recipe along with a quantity of each ingredient in the list of ingredients. The list of ingredients may be imported at the mapping module 280 from the LLM in the specific format. To facilitate integration with the online concierge system 140, the mapping module 280 may first convert the imported list of ingredients into a temporary webpage. The mapping module 280 may leverage a cloud storage service (e.g., part of the mapping module 280, or some other module of the online concierge system 140) to convert the list of ingredients into the temporary webpage. The temporary webpage may serve as a uniform resource locator (URL) that can be directly utilized as a recipe extension by, e.g., a recipe extension module of the mapping module 280.

The mapping module 280 may use the list of ingredients obtained from the LLM (e.g., in the form of recipe extension) to search a database of the online concierge system 140 (e.g., at the data store 240) to find items that match the list of ingredients, i.e., to map the list of ingredients to corresponding items (i.e., products) that are available at one or more retailers. Based on the search of the database, the mapping module 280 may map specific items to the ingredients listed on the temporary webpage. Once the mapping between ingredients from the physical recipe and items from the database is determined, the mapping module 280 may identify one or more stores that are associated with at least one retailer where these specific items are available in stock.

In one or more embodiments, the mapping module 280 selects the at least one retailer based on an explicit request from a customer of the online concierge system 140 (e.g., as provided via a user interface of the customer client device 100). In one or more other embodiments, the mapping module 280 selects the at least one retailer based on a profile of the customer including the customer's purchasing history (e.g., as available at the data store 240). Alternatively or additionally, the mapping module 280 may search the database using the list of ingredients from the LLM with information about an item type for each ingredient in the list of ingredients to identify a set of candidate items in the database that match item types for the list of ingredients. The mapping module 280 may then select a set of items from the identified set of candidate items based on, e.g., a score of each candidate item in the set of candidate items. The mapping module 280 may score each candidate item in the set of candidate items based on, e.g., a likelihood of customer's conversion for that candidate item. In one or more embodiments, the mapping module 280 deploys a computer model (e.g., machine-learning computer model) to score each candidate item in the set of candidate items based on, e.g., information about the customer's purchasing history and a likelihood of the customer's conversion.

Responsive to generating a list of items by the mapping module 280 that matches the list of ingredients, the content presentation module 210 causes a device of the customer (e.g., the customer client device 100) to display a user interface with the list of items. The customer can then include the entire list of items as a group into a shopping cart. Alternatively, the customer may be able to unselect any item from the list (e.g., via an unselect button available at the user interface), e.g., if the customer already has that particular item. In such a case, the customer may include a subset of items from the list of items into the shopping cart. In one or more embodiments, the content presentation module 210 may automatically populate the shopping cart with the list of items. And, in such cases, the customer may be able to unselect any item from the shopping cart (e.g., via an unselect button available at the user interface), e.g., if the customer already has that particular item. In one or more other embodiments, the content presentation module 210 (or some other module of the online concierge system 140, such as the mapping module 280) may identify a set of staple items (e.g., based on the customer's purchasing history) that the customer is likely to already have. The content presentation module 210 may then cause the device of the customer to display a user interface with the set of staple items that can be optionally added to the shopping cart by the customer. In such cases, the set of staple items would not be initially included into the resulting list of items.

Thus, once the items and their availability are determined (e.g., at one or more stores of at least one retailer), the content presentation module 210 causes the device of the customer to display the user interface with a recipe that includes the required ingredients from the physical recipe mapped to specific items and their corresponding stores (or retailers). With the recipe automatically created and displayed at the user interface, the customer can seamlessly add the required ingredients to the shopping cart. By following a few simple steps, the customer can complete the shopping experience with accuracy and convenience.

Figure 3:
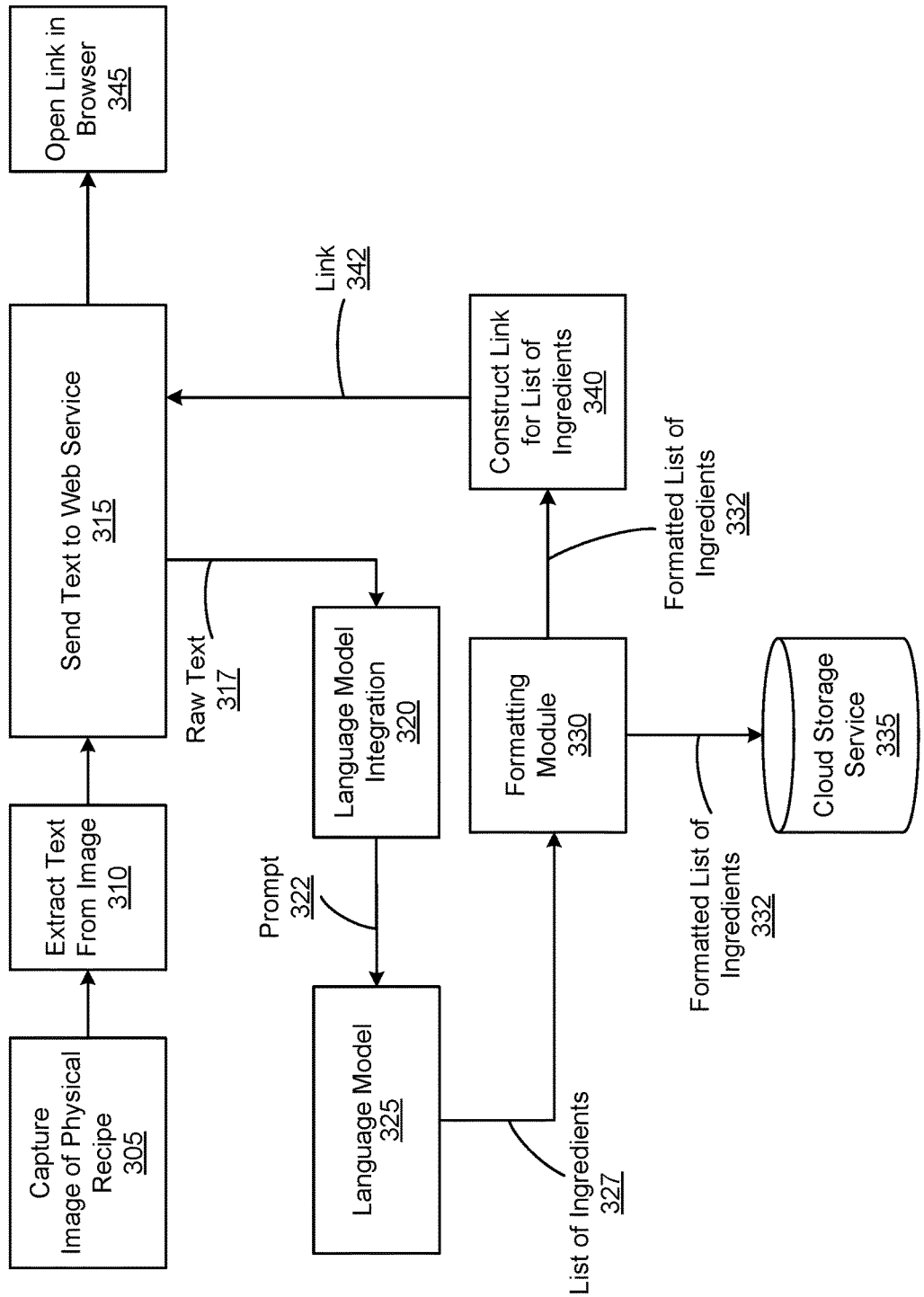
FIG. 3 illustrates an example architectural flow of performing a character recognition extraction and application of a language model to automatically populate a cart of a customer of an online concierge system with items from a physical recipe, in accordance with one or more embodiments.

FIG. 3 illustrates an example architectural flow 300 of performing a character recognition extraction and application of a language model to automatically populate a cart of a customer of the online concierge system 140 with items from a physical recipe, in accordance with one or more embodiments. At 305, an image of a physical recipe may be captured (e.g., via a camera of the customer client device 100). At 310, a text (e.g., raw text) may be extracted from the captured image (e.g., via the extraction module 260). At 315, an extracted text may be sent to a web service (e.g., of the mapping module 280) through, e.g., an application programming interface (API). At 330, a raw text 317 extracted from the captured image of the physical recipe may be provided for a language model integration 320 (e.g., at the prompting module 270). After the language model integration 320, a prompt 322 generated based at least in part on the raw text 317 may be provided to a language model 325 (e.g., LLM of the model serving system 150).

A list of ingredients 327 extracted by the language model 325 from the raw text 317 may be provided to a formatting module 330 (e.g., part of the mapping module 280 or some other module of the online concierge system 140). The formatting module 330 may format a text associated with the list of ingredients 327 into, e.g., a Hyper Text Markup Language (HTML) by performing the ingredient tagging/ division. The formatting module 330 may upload a formatted list of ingredients 332 (i.e., an HTML version of the list of ingredients 327) into a cloud storage service 335 (e.g., part of the mapping module 280, or some other module of the online concierge system 140). The formatted list of ingredients 332 uploaded at the cloud storage service 335 may be used for searching a database of the online concierge system 140 (e.g., at the data store 240) to find items that match the list of ingredients. Furthermore, at 340, the formatted list of ingredients may be used (e.g., at the mapping module 280 or some other module of the online concierge system 140) to construct a link 342 (e.g., deep link) for the list of ingredients. The link 342 for the list of ingredients may be sent back to the web service. At 345, the link 342 for the list of ingredients may be open in a browser (e.g., browser of the customer client device 100).

Figure 4A:
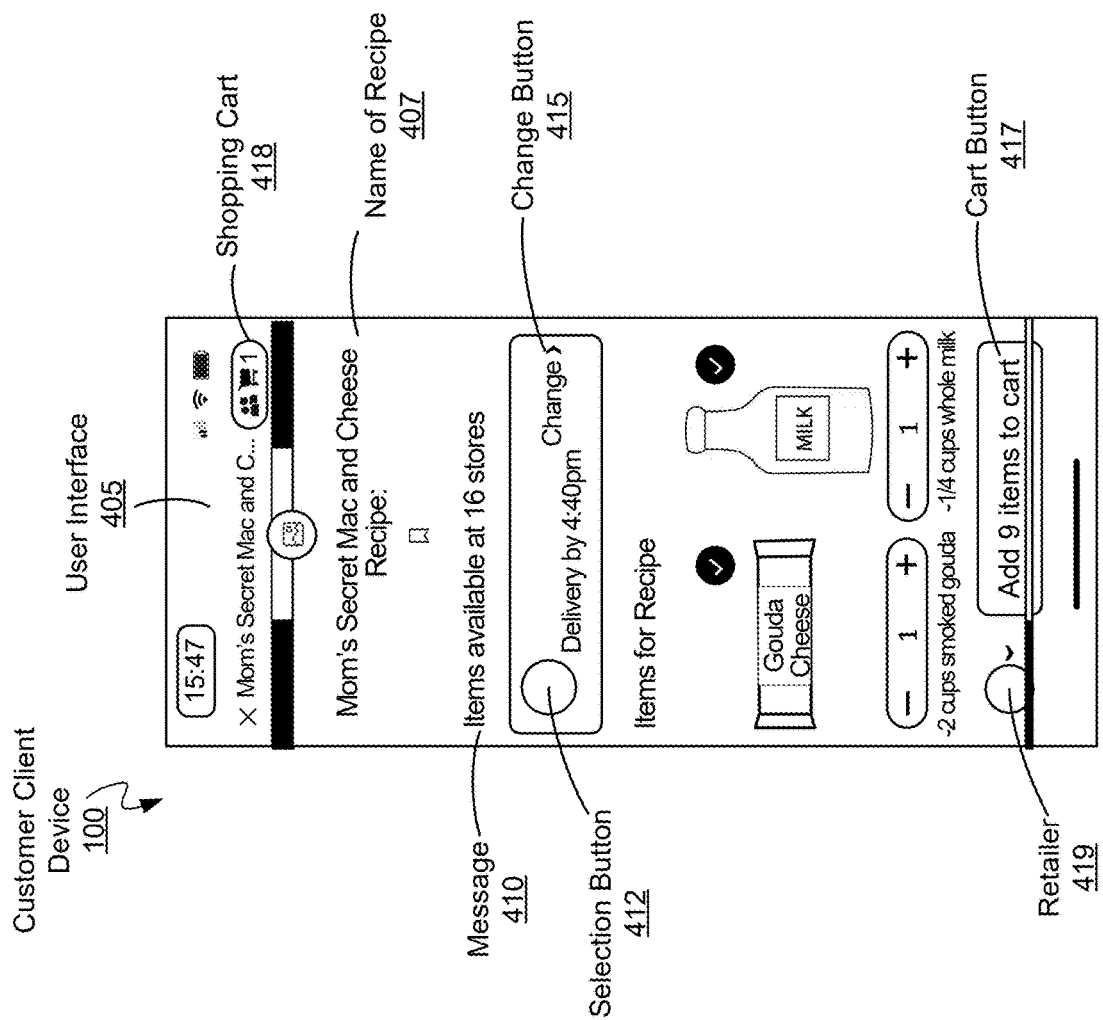
FIG. 4A illustrates a first example user interface displayed at a customer client device with a list of items automatically generated from a physical recipe, in accordance with one or more embodiments.

FIG. 4A illustrates a first example user interface displayed at the device of the customer (e.g., the customer client device 100) with a list of items automatically generated from a physical recipe, in accordance with one or more embodiments. The content presentation module 210 may cause the device of the customer to initially display a user interface 405 that shows a name of recipe 407 (e.g., as selected by the customer), a message 410 informing the customer at how many stores (e.g., retailers) corresponding items from the recipe are available, a selection button 412 for selection of one particular store or retailer, and a list of items along with their quantities. The customer may change the automatically selected retailer (or store) via a change button 415. The user interface 405 may further display a cart button 417 for adding, e.g., all 9 items from the list of items associated with a retailer 419 into a shopping cart 418.

Figure 4B:
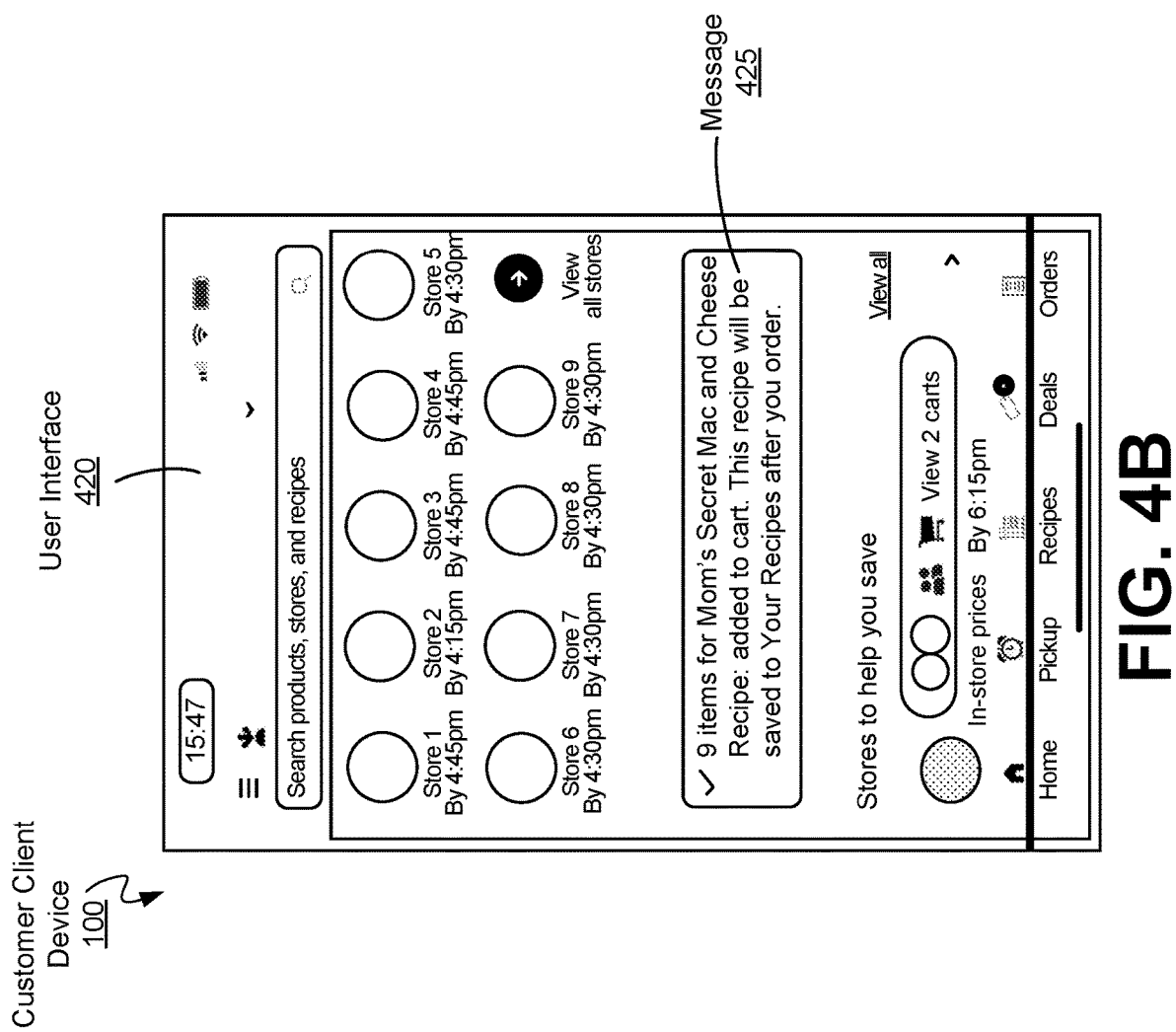
FIG. 4B illustrates a second example user interface displayed at a customer client device with a list of items automatically generated from a physical recipe, in accordance with one or more embodiments.

FIG. 4B illustrates a second example user interface displayed at the device of the customer (e.g., the customer client device 100) with a list of items automatically generated from a physical recipe, in accordance with one or more embodiments. When the customer presses the change button 415 at the user interface 405 in FIG. 4A, the content presentation module 210 may cause the device of the customer to display a user interface 420 with multiple stores (i.e., retailers) where corresponding ingredients from the physical recipe are available, e.g., as shown in FIG. 4B. Then, the customer may select any store shown at the user interface 420 in FIG. 4B as a replacement of the automatically selected store (i.e., retailer) shown at the user interface 405 in FIG. 4A. Additionally, the user interface 420 may display a message 425 for the customer that, e.g., 9 items for the physical recipe with the name of recipe 407 are added to the customer's shopping cart.

Figure 4C:
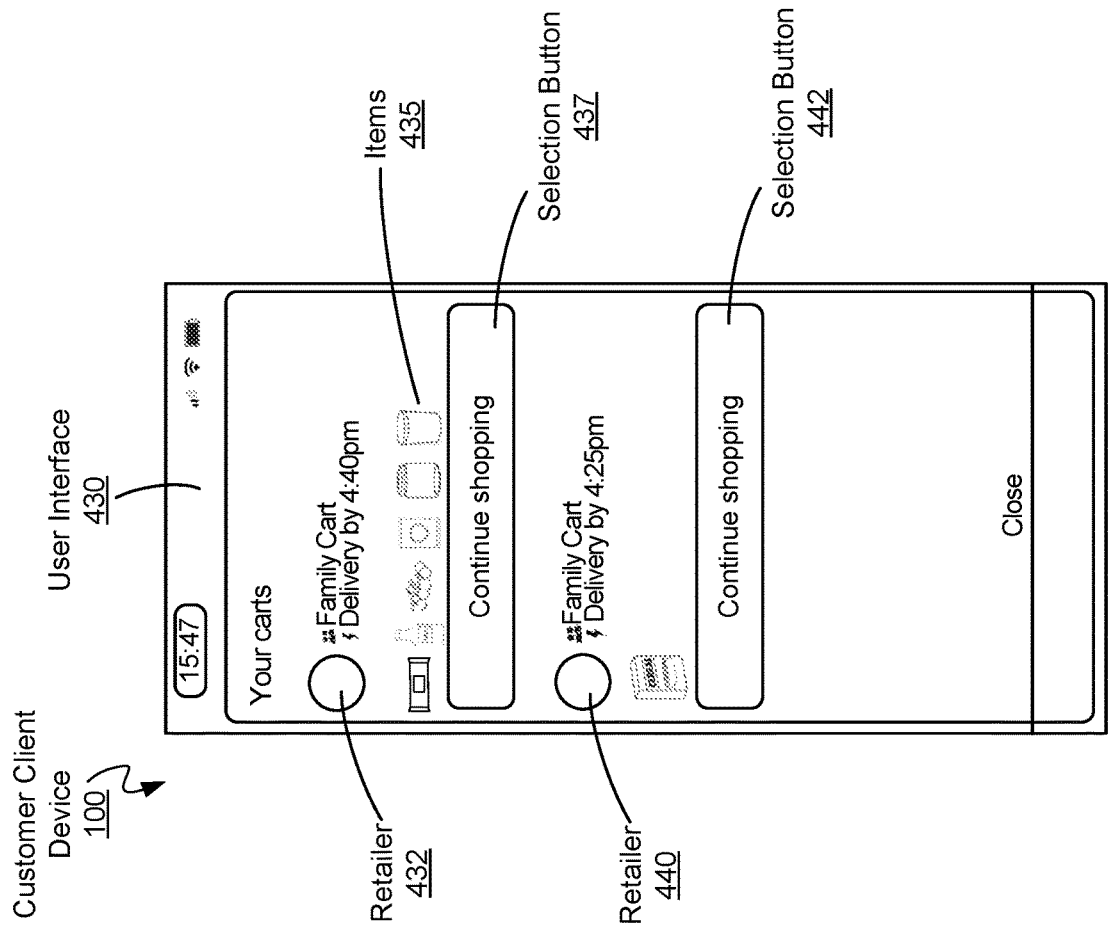
FIG. 4C illustrates a third example user interface displayed at a customer client device with a list of items automatically generated from a physical recipe, in accordance with one or more embodiments.

FIG. 4C illustrates a third example user interface displayed at the device of the customer (e.g., the customer client device 100) with a list of items automatically generated from a physical recipe, in accordance with one or more embodiments. Upon reviewing the user interface 420 in FIG. 4B, the customer may decide to keep the automatically selected store (i.e., retailer) as shown at the user interface 405 in FIG. 4A. In such a case, the content presentation module 210 may cause the device of the customer to display the user interface 430 in FIG. 4C that shows the customer's shopping cart with an automatically selected retailer 432 and a list of items 435 associated with ingredients from the physical recipe, as well as information about a delivery time for the list of items 435. The user interface 430 may also display a selection button 437 that the customer can press to continue shopping at the retailer 432. The user interface 430 may further display another retailer 440 associated with another shopping cart, as well as a selection button 442 that the customer can press to continue shopping at the retailer 440. The retailer 440 may be associated with one or more staple items from the physical recipe that the customer is likely to already have. Alternatively, the retailer 440 and the cart associated with the retailer 440 may not be related to the physical recipe.

Figure 5:
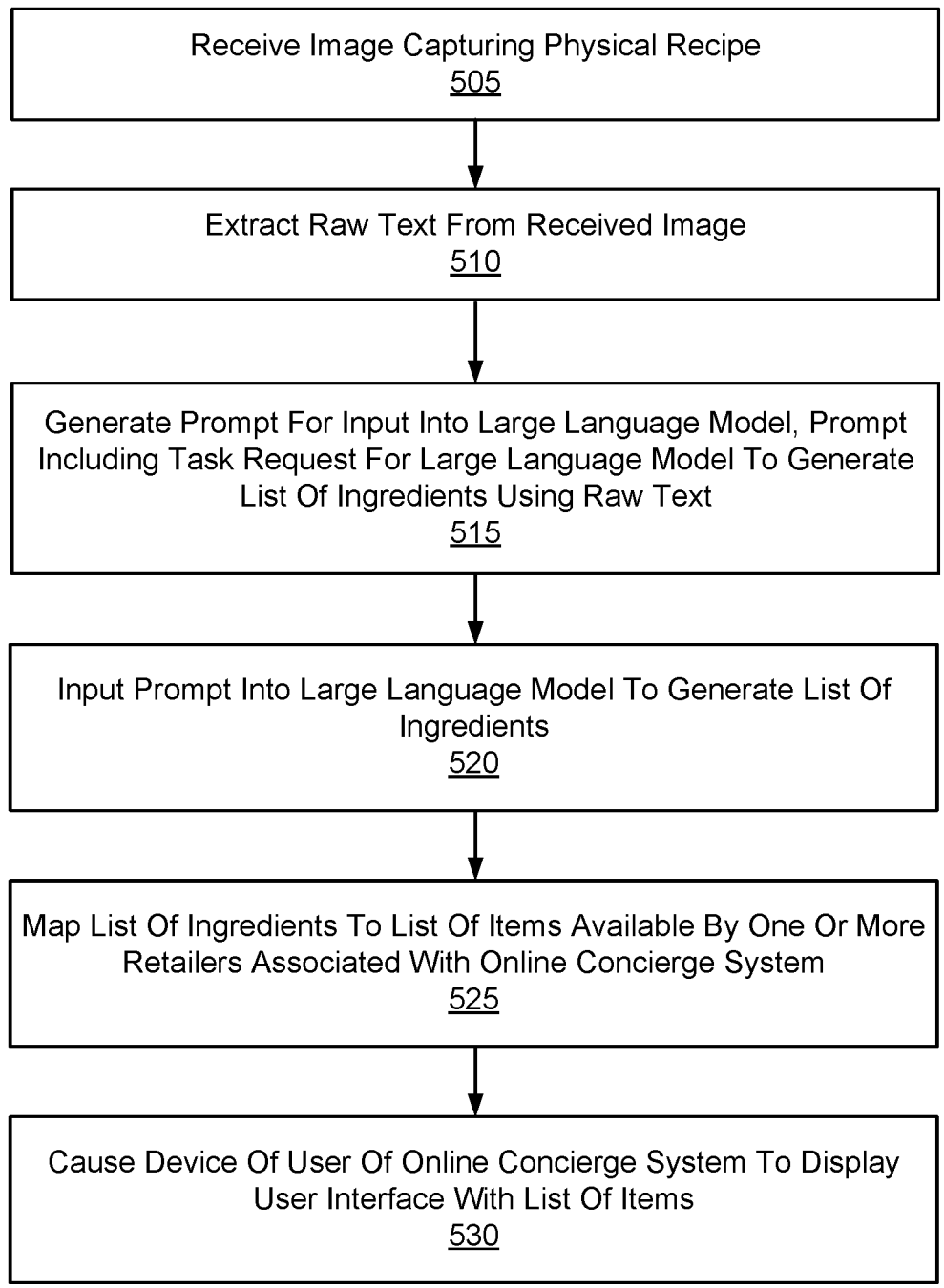
FIG. 5 is a flowchart of a method of using an optical character recognition extraction and a language model to automatically populate a cart of a user of an online concierge system with items from a physical recipe, in accordance with one or more embodiments.

FIG. 5 is a flowchart of a method of using an optical character recognition extraction and a language model to automatically populate a cart of a user of an online concierge system with items from a physical recipe, in accordance with one or more embodiments. Alternative embodiments may include more, fewer, or different steps from those illustrated in FIG. 5, and the steps may be performed in a different order from that illustrated in FIG. 5. These steps may be performed by an online concierge system (e.g., the online concierge system 140). Additionally, each of these steps may be performed automatically by the online concierge system without human intervention.

The online concierge system 140 receives 505 (e.g., via the image reception module 250) an image capturing a physical recipe. The online concierge system 140 extracts 510 (e.g., via the extraction module 260) a raw text from the received image. The online concierge system 140 may extract (e.g., via the extraction module 260) the raw text from the received image using an OCR algorithm. The online concierge system 140 may parse (e.g., via the extraction module 260) the extracted raw text to exclude a non-textual portion from the raw text prior to generating a prompt for input into a LLM (e.g., LLM of the model serving system 150). The online concierge system 140 may extract (e.g., via the extraction module 260) a bounding box from the received image that includes at least one image of at least one ingredient.

The online concierge system 140 generates 515 (e.g., via the prompting module 270) a prompt for input into a LLM (e.g., LLM of the model serving system 150), the prompt including a task request for the LLM to generate a list of ingredients using the raw text. The online concierge system 140 may include (e.g., via the prompting module 270) information into the prompt that the raw text relates to a recipe. The online concierge system 140 may generate (e.g., via the prompting module 270) the prompt for input into the LLM by including the at least one image of the at least one ingredient in the prompt. The online concierge system 140 may input 520 (e.g., via the prompting module 270) the prompt into the LLM to generate the list of ingredients.

The online concierge system 140 maps 525 (e.g., via the mapping module 280) the list of ingredients to a list of items available by one or more retailers associated with an online concierge system. The online concierge system 140 may select (e.g., via the mapping module 280) the one or more retailers based on at least one of a request from the user and a profile of the user. The online concierge system 140 may search (e.g., via the mapping module 280) a database of the online concierge system 140 (e.g., catalog at the data store 240) using the list of ingredients with information about an item type for each ingredient in the list of ingredients to identify a plurality of candidate items that match item types for the list of ingredients. The online concierge system 140 may select (e.g., via the mapping module 280) the list of items from the plurality of candidate items. The online concierge system 140 may score (e.g., via the mapping module 280) each candidate item of the plurality of candidate items. The online concierge system 140 may select (e.g., via the mapping module 280) the list of items based on a score of each candidate item of the plurality of candidate items.

The online concierge system 140 causes 530 (e.g., via the content presentation module 210) a device of the user (e.g., the customer client device 100) to display a user interface with the list of items. The online concierge system 140 may automatically add (e.g., via the content presentation module 210) the list of items to a cart of the user. Alternatively, the online concierge system 140 may cause (e.g., via the content presentation module 210) the device of the user to display the user interface with a button for each item in the list of items for unselecting that item from the list of items prior to including one or more items from the list of items into the cart. The online concierge system 140 may identify (e.g., via the mapping module 280) a set of items associated with a set of ingredients from the list of ingredients (e.g., staple ingredients or other items that the user is likely to have). The online concierge system 140 may cause (e.g., via the content presentation module 210) the device of the user to display the user interface that further includes the identified set of items for adding to the cart in addition to one or more items from the list of items.

Embodiments of the present disclosure are directed to utilizing a language model to automatically populate a cart of a user of the online concierge system 140 with a list of items that are related to ingredients specified in a physical recipe. The approach presented herein provides for tools that enable "one-click inclusion" of recipe ingredients into the cart of the user. To address the challenge of converting physical recipes into shopping carts at the online concierge system 140, a comprehensive solution is presented herein that leverages the capabilities of various technologies to streamline the process and that empowers users of the online concierge system 140 to convert their physical recipes effortlessly and automatically into accurate and tailored shopping carts.

The solution presented herein incorporates the robust infrastructure capable of matching generic ingredients with specific items available at grocery stores of one or more selected retailers, as well as the technology to extract and parse texts of physical recipes. The solution presented herein utilizes the language model to parse the recipe to find the comprehensive list of ingredients, avoids complex rules, and makes the algorithm more robust for different styles/formats of recipes. By providing users with a user-friendly and intuitive process for recipe conversion, the online concierge system 140 presented herein enhances customer satisfaction, saves time, and delivers a seamless shopping experience that aligns with their needs and preferences. By integrating the OCR-based extraction capabilities, the natural language processing capabilities of the language model, and data management capabilities, the solution presented herein provides an efficient and user-friendly method for converting physical recipes into digital shopping carts at the online concierge system 140. Additionally, the presented automatic process results in more accurate lists of items for presentation to users as the automatic process eliminates the risk of human error.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:
receiving an image capturing a physical recipe;
extracting a raw text from the received image;
extracting a bounding box from the received image that includes one or more images of one or more ingredients of the physical recipe;
generating a prompt for input into a generative model, the prompt including a task request for the generative model to generate a list of ingredients using the raw text and the bounding box including the one or more images;
requesting the generative model to generate the list of ingredients using the prompt;
formatting a text associated with the list of ingredients into a Hyper Text Markup Language (HTML) format by performing an ingredient tagging to generate a formatted list of ingredients;
uploading the formatted list of ingredients into a cloud storage service;
searching, using the formatted list of ingredients uploaded at the cloud storage service, a database of the computer system to find a list of items that match the list of ingredients;
causing a device associated with a user of an online system to generate a user interface, wherein generating the user interface comprises rendering, in a single view, the list of items that is linked to a cart visually displayed at the user interface, the cart being updated with the list of items in response to a single selection of an add-all control element displayed at the user interface;
constructing, using the formatted list of ingredients, a link for the list of ingredients;
sending, through an application programming interface (API), the link to a web service of the online system; and
responsive to an interaction with the link, causing the device associated with the user to update the user interface with the list of ingredients.

2. The method of claim 1, wherein extracting the raw text comprises:
extracting the raw text from the received image using an optical character recognition (OCR) algorithm.

3. The method of claim 1, further comprising:
parsing the extracted raw text to exclude a non-textual portion from the raw text prior to generating the prompt for input into the generative model.

4. The method of claim 1, wherein generating the prompt for input into the generative model further comprises:
including information into the prompt that the raw text relates to a recipe.

5. The method of claim 1, further comprising:
selecting one or more entities based on at least one of a request from the user and a profile of the user, wherein items from the list of items are available by the one or more entities.

6. The method of claim 1, wherein searching the database comprises:
searching the database using information about an item type for each ingredient in the formatted list of ingredients to identify a plurality of candidate items that match item types for the formatted list of ingredients; and
selecting the list of items from the plurality of candidate items.

7. The method of claim 6, wherein selecting the list of items comprises:
scoring each candidate item of the plurality of candidate items; and selecting the list of items based on a score of each candidate item of the plurality of candidate items.

8. The method of claim 1, further comprising:
automatically adding the list of items to the cart.

9. The method of claim 1, wherein causing the device to generate the user interface comprises:
generating the user interface to display a control element for each item in the list of items for unselecting each item from the list of items prior to including one or more items from the list of items into the cart.

10. The method of claim 1, further comprising:
identifying a set of items associated with a set of ingredients from the formatted list of ingredients,
wherein causing the device to generate the user interface further comprises generating the user interface that includes the identified set of items for adding to the cart in addition to one or more items from the list of items.

11. A computer program product comprising a non-transitory computer readable storage medium having instructions encoded thereon that, when executed by a processor, cause the processor to perform steps comprising:
receiving an image capturing a physical recipe;
extracting a raw text from the received image;
extracting a bounding box from the received image that includes one or more images of one or more ingredients of the physical recipe;
generating a prompt for input into a generative model, the prompt including a task request for the generative model to generate a list of ingredients using the raw text and the bounding box including the one or more images;
requesting the generative model to generate the list of ingredients using the prompt;
formatting a text associated with the list of ingredients into a Hyper Text Markup Language (HTML) format by performing an ingredient tagging to generate a formatted list of ingredients;
uploading the formatted list of ingredients into a cloud storage service;
searching, using the formatted list of ingredients uploaded at the cloud storage service, a database of a computer system to find a list of items that match the list of ingredients;
causing a device associated with a user of an online system to generate a user interface, wherein generating the user interface comprises rendering, in a single view, the list of items that is linked to a cart visually displayed at the user interface, the cart being updated with the list of items in response to a single selection of an add-all control element displayed at the user interface;
constructing, using the formatted list of ingredients, a link for the list of ingredients;
sending, through an application programming interface (API), the link to a web service of the online system; and
responsive to an interaction with the link, causing the device associated with the user to update the user interface with the list of ingredients.

12. The computer program product of claim 11, wherein the instructions further cause the processor to perform steps comprising:
extracting the raw text from the received image using an optical character recognition (OCR) algorithm.

13. The computer program product of claim 11, wherein the instructions further cause the processor to perform steps comprising:
generating the prompt for input into the generative model by further including information into the prompt that the raw text relates to a recipe.

14. The computer program product of claim 11, wherein the instructions further cause the processor to perform steps comprising:
selecting one or more entities based on at least one of a request from the user and a profile of the user, wherein items from the list of items are available by the one or more entities.

15. The computer program product of claim 11, wherein the instructions further cause the processor to perform steps comprising:
searching the database using information about an item type for each ingredient in the formatted list of ingredients to identify a plurality of candidate items that match item types for the formatted list of ingredients;
scoring each candidate item of the plurality of candidate items; and
selecting the list of items based on a score of each candidate item of the plurality of candidate items.

16. The computer program product of claim 11, wherein the instructions further cause the processor to perform steps comprising:
automatically adding the list of items to the cart.

17. The computer program product of claim 11, wherein the instructions further cause the processor to perform steps comprising:
causing the device of the user to generate the user interface to display a control element for each item in the list of items for unselecting each item from the list of items prior to including one or more items from the list of items into the cart.

18. A computer system comprising:
a processor; and
a non-transitory computer-readable storage medium having instructions that, when executed by the processor, cause the computer system to perform steps comprising:
receiving an image capturing a physical recipe;
extracting a raw text from the received image;
extracting a bounding box from the received image that includes one or more images of one or more ingredients of the physical recipe;
generating a prompt for input into a generative model, the prompt including a task request for the generative model to generate a list of ingredients using the raw text and the bounding box including the one or more images;
requesting the generative model to generate the list of ingredients using the prompt;
formatting a text associated with the list of ingredients into a Hyper Text Markup Language (HTML) format by performing an ingredient tagging to generate a formatted list of ingredients;
uploading the formatted list of ingredients into a cloud storage service;
searching, using the formatted list of ingredients uploaded at the cloud storage service, a database of the computer system to find a list of items that match the list of ingredients;
causing a device associated with a user of an online system to generate a user interface, wherein generating the user interface comprises rendering, in a single view, the list of items that is linked to a cart visually displayed at the user interface, the cart being updated with the list of items in response to a single selection of an add-all control element displayed at the user interface;
constructing, using the formatted list of ingredients, a link for the list of ingredients;
sending, through an application programming interface (API), the link to a web service of the online system; and
responsive to an interaction with the link, causing the device associated with the user to update the user interface with the list of ingredients.

\* \* \* \* \*